(12) United States Patent
Stoop et al.

(10) Patent No.: US 9,930,100 B2
(45) Date of Patent: *Mar. 27, 2018

(54) PROGRESSIVE BACKGROUND UPLOADING (71) Applicant: Facebook, Inc., Menlo Park, CA (US)

(72) Inventors: Dirk John Stoop, Menlo Park, CA (US); Paul Carduner, Menlo Park, CA (US); Hamilton Chong, Saratoga, CA (US); Alex Li, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/949,020

(22) Filed: Nov. 23, 2015

(65) Prior Publication Data

US 2016/0080471 A1 Mar. 17, 2016

Related U.S. Application Data

(63) Continuation of application No. 13/607,326, filed on Sep. 7, 2012, now Pat. No. 9,246,974.

(51) Int. Cl.
*H04W 76/02* (2009.01)
*H04L 29/08* (2006.01)
*G06F 17/30* (2006.01)
*H04W 4/18* (2009.01)

(52) U.S. Cl.
CPC ............ *H04L 67/06* (2013.01); *H04L 67/02* (2013.01); *H04L 67/2828* (2013.01); *H04W 4/18* (2013.01); *H04W 76/026* (2013.01); *H04L 67/2842* (2013.01)

(58) Field of Classification Search
CPC ...... H04L 67/06; H04L 29/08; H04W 76/026; H04W 4/18; G06F 15/16
USPC ......................................................... 709/219
See application file for complete search history.

(56) References Cited

U.S. PATENT DOCUMENTS

| 8,331,566 | B1* | 12/2012 | Foote | H04L 67/2828 380/255 |
|---|---|---|---|---|
| 2006/0259588 | A1 | 11/2006 | Lerman et al. | |
| 2007/0035764 | A1* | 2/2007 | Aldrich | G06F 17/3028 358/1.15 |
| 2009/0164606 | A1* | 6/2009 | Epifania | G06F 17/30899 709/219 |
| 2010/0107080 | A1* | 4/2010 | Bentley | G11B 27/034 715/723 |
| 2012/0308209 | A1* | 12/2012 | Zaletel | G11B 27/034 386/278 |

(Continued)

*Primary Examiner* — Kevin Bates
*Assistant Examiner* — Mark A Scott
(74) *Attorney, Agent, or Firm* — Baker Botts L.L.P.

(57) ABSTRACT

In one embodiment, a method includes accessing a first instance of content to be uploaded to a server, generating a second instance of the content from the first instance, automatically uploading to the server the second instance of the content, and automatically uploading to the server the first instance of the content in response to occurrence of a pre-determined upload condition. The first instance has a first file size and the second instance has a second file size that is smaller than the first file size. The upload of the second instance makes the content available for access at least in part by one or more second users at an immediate point in time. The upload of the first instance of the content makes the content available for access by the second users in an original version.

20 Claims, 8 Drawing Sheets

(56) References Cited

U.S. PATENT DOCUMENTS

| | | | |
|---|---|---|---|
| 2012/0323930 A1* | 12/2012 | Kennberg | G06F 17/30268 |
| | | | 707/748 |
| 2012/0324002 A1* | 12/2012 | Chen | G06F 17/30274 |
| | | | 709/204 |
| 2013/0041948 A1* | 2/2013 | Tseng | H04L 67/06 |
| | | | 709/204 |
| 2013/0042276 A1 | 2/2013 | Payette et al. | |
| 2013/0111011 A1* | 5/2013 | Moulhaud | G06F 11/3495 |
| | | | 709/224 |
| 2013/0166390 A1* | 6/2013 | Blow | H04L 67/06 |
| | | | 705/14.66 |
| 2013/0166391 A1* | 6/2013 | Blow | H04L 67/06 |
| | | | 705/14.66 |
| 2013/0185368 A1* | 7/2013 | Nordstrom | H04L 51/32 |
| | | | 709/206 |
| 2013/0238762 A1 | 9/2013 | Raleigh et al. | |
| 2014/0032718 A1 | 1/2014 | Berger et al. | |
| 2014/0052825 A1 | 2/2014 | Luecke et al. | |
| 2014/0129627 A1* | 5/2014 | Baldwin | H04L 67/306 |
| | | | 709/204 |
| 2014/0195921 A1* | 7/2014 | Grosz | G06F 3/1242 |
| | | | 715/738 |

* cited by examiner

PROGRESSIVE BACKGROUND UPLOADING

PRIORITY

This non-provisional application is a continuation of U.S. application Ser. No. 13/607,326 filed Sep. 7, 2012 and entitled "Progressive Background Uploading," the entirety of which is hereby incorporated by reference.

TECHNICAL FIELD

This disclosure generally relates to uploading images from a client to a server.

BACKGROUND

A mobile computing device—such as a smartphone, tablet computer, or laptop computer—may include functionality for determining its location, direction, or orientation, such as a GPS receiver, compass, or gyroscope. Such a device may also include functionality for communicating with one or more wireless networks, such as one or more wireless local area networks (WLANs) or cellular telephone networks. Such a device may also include one or more cameras, touchscreens, microphones, or speakers. Social-networking applications may be available for mobile computing devices. With such applications, users may connect, communicate, and share information with other users in their social networks.

SUMMARY

Particular embodiments may reduce or eliminate problems often associated with uploading images or other content from a mobile computing device.

In particular embodiments, a mobile computing device may progressively upload images of various resolutions. The mobile computing device may upload to a server of a social-networking system a lower-resolution (or smaller-file-size) version of a selected image before uploading a higher-resolution (or larger-file-size) version of the image. For example, a user of a social-networking system may take a photograph with the mobile computing device and, immediately after taking the photograph, upload a lower resolution version of the photograph to a server of the social-networking system. The mobile computing device may later, when uploading conditions have improved, upload a higher-resolution version of the photograph to a server of the social-networking system. The later upload may occur automatically, for example, in response to the mobile computing device detecting improved upload conditions. When uploaded, the higher-resolution version of the photograph may replace the lower-resolution version of the photograph in the social-networking system. Such progressive uploading may facilitate the use or sharing (such as posting to walls or timelines of users' profiles) of images or other content closer in time to the events that they are associated with.

Particular embodiments may provide a user interface on a mobile computing device that enables a user to select one or more images on the mobile computing device to upload, post, or otherwise transmit to, for example, a social network. After selecting the one or more images to upload but before the user selects an option to upload or post the one or more images, the mobile computing device begins transmitting a small-sized image. At a later time, a larger-sized image may be uploaded by the mobile computing device. As a result, images may be uploaded and posted to, for example, a social network in a quicker, more efficient manner than typical methods.

BRIEF DESCRIPTION OF THE DRAWINGS

FIGS. 4A-B illustrate upload queues that may be utilized by the mobile computing device of FIG. 1 to progressively upload image files, in accordance with an embodiment of the disclosure;

The figures depict various embodiments of the present disclosure for purposes of illustration only. One skilled in the art will readily recognize from the following discussion that alternative embodiments of the structures and methods illustrated herein may be employed without departing from the principles of the invention described herein.

DESCRIPTION OF EXAMPLE EMBODIMENTS

To enable a mobile computing device to timely and efficiently communicate one or more images stored on the mobile computing device, embodiments of the disclosure provide a mechanism for progressively uploading various resolutions or sizes of images. In particular, embodiments of the invention enable a small (e.g., thumbnail-sized) image to be uploaded from a mobile computing device as soon as a user selects an image but before the user selects an option to upload the image. At a later time, a higher resolution image (e.g., the original image) may be uploaded from the mobile computing device. In some cases, this original image may replace the small image that was initially uploaded.

In one embodiment, a user interface may be provided on a mobile computing device that enables a user to select one or more images on the mobile computing device to upload, post, or otherwise transmit to, for example, a social network. After selecting the one or more images to upload but before the user selects an option to actually upload or post the one or more images, the mobile computing device begins transmitting a small-sized image. In certain embodiments, the small-sized image may be generated from an original image according to a minimally-acceptable resolution and may be transmitted to a social network using a cellular communications link. At a later time, a larger-sized image may be uploaded by the mobile computing device. For example, when the mobile computing device connects to a wireless local area network (e.g., a Wi-Fi network) at a later time, the mobile computing device may upload the original image that has a larger resolution than the small-sized image. This image may replace the small-sized image in some embodiments. As a result, images may be uploaded and posted to, for example, a social network in a quicker, more efficient manner than typical methods. Accordingly, the methods and systems described below provide for progressive background uploading of images, according the certain embodiments.

Figure 1:
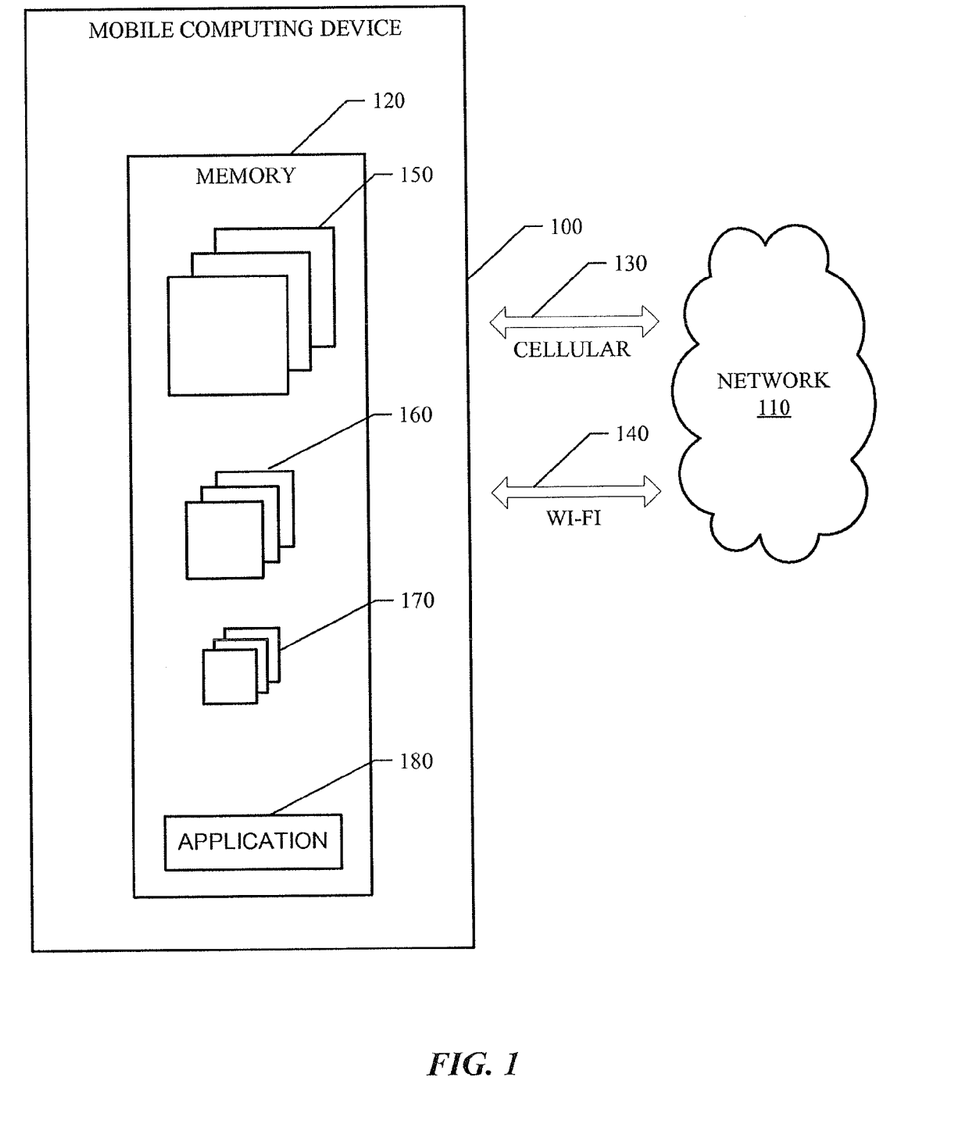
FIG. 1 illustrates an example mobile computing device for providing progressive background uploading of images, according to certain embodiments of the present disclosure.

FIG. 1 illustrates an example mobile computing device 100 for providing progressive background uploading of images. Mobile computing device 100 includes memory 120. Memory 120 may store one or more original image files 150, one or more mid-sized image files 160, one or more small image files 170, and an application 180. Mobile computing device 100 may communicate with a network 110 using a cellular communications link 130 or a wireless local area network (WLAN) link 140. In some embodiments, WLAN link 140 may be a Wi-Fi communications link.

Figure 4A:
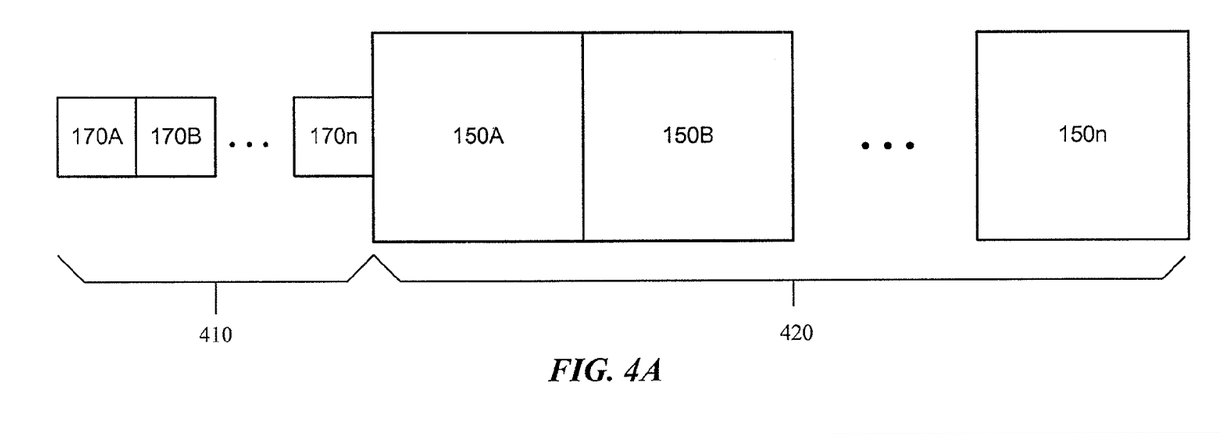
Figure 4B:
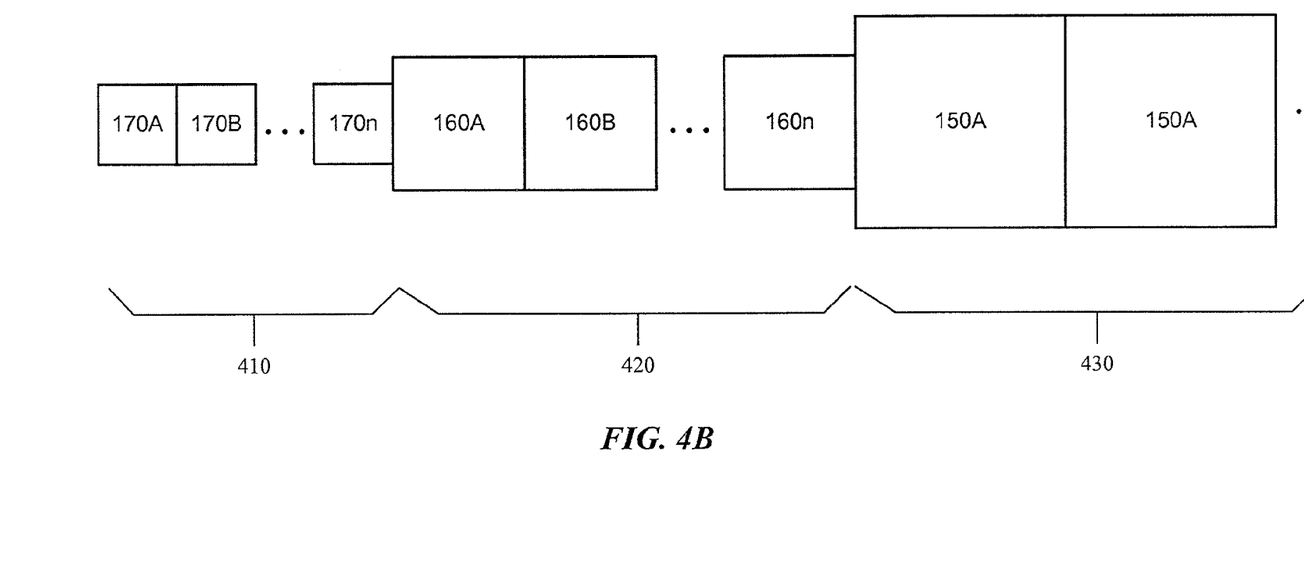

In general, a user may interact with mobile computing device 100 using any appropriate user interface including, for example, a graphical user interface (GUI). In doing so, the user may view and select one or more images to upload, post, or otherwise transmit (hereinafter collectively "upload") to network 110. For example, the user may utilize a GUI on mobile computing device 100, such as those illustrated in FIGS. 2A and 2B, in order to view and select one or more images to upload to a social network. However, the images stored on mobile computing device 100 that are associated with those images selected to upload are typically original image files 150 that have large resolutions and thus large file sizes. As a result, the selected images may take an extended period of time and bandwidth to upload. Embodiments of the disclosure reduce or eliminate problems associated with typical methods by uploading small image files 170 first and then original image files 150 or mid-sized image files 160 at a later time. For example, mobile computing device 100 may first upload small image file 170 when a user selects images to upload but before the user actually selects an option to upload or post the images. Mobile computing device 100 may then upload original image file 150 or mid-sized image file 160 at a later time when upload conditions improve. For example, mobile computing device 100 may upload original image file 150 or mid-sized image file 160 when mobile computing device 100 has established a WLAN communications link 140. In some embodiments, mobile computing device 100 may establish one or more queues for uploading the various sizes of images. FIGS. 4A and 4B below illustrate various embodiments of queues that may be utilized in some embodiments.

Mobile computing device 100 may be any device that is capable of communicating with network 110. In some embodiments, mobile computing device 100 may be a mobile telephone, a smartphone, a laptop computer, a digital audio player, a tablet computer, and the like. Mobile computing device 100 may include memory 120 that is capable of storing content such as one or more original image files 150, one or more mid-sized image files 160, one or more small image files 170, or application 180.

Cellular communications link 130 may be any appropriate radio-frequency based communications link in which mobile computing device 100 utilizes to communicate with a radio transceiver. For example, cellular communications link 130 may be a communications link that utilizes any version of the Global System for Mobile Communications (GSM) standard. In other embodiments, any other appropriate communications standard may be utilized for cellular communications link 130. Mobile computing device 100 may communicate data, including original image file 150, mid-sized image file 160, or small image file 170 via cellular communications link 130.

WLAN 140 may be any appropriate wireless local area connection. In some embodiments, WLAN communications link 140 may be any Institute of Electrical and Electronics Engineers (IEEE) 802.11 communications link (e.g., Wi-Fi). In other embodiments, any other appropriate communications standard may be utilized for WLAN communications link 140. Mobile computing device 100 may communicate data, including original image file 150, mid-sized image file 160, or small image file 170 via WLAN communications link 140. Generally, mobile computing device 100 is able to communicate data across WLAN communications link 140 at a higher rate than cellular communications link 130.

Original image file 150 may be any image file stored on mobile computing device 100. In certain embodiments, original image file 150 is an image file that is generated by a camera of mobile computing device 100. Many modern mobile computing devices 100, such as smartphones, have multi-megapixel cameras that generate image files having multi-megabyte (MB) file sizes. For example, one embodiment of mobile computing device 100 may have an 8-10 megapixel camera that generates original image files 150 having 2-5 MB file sizes. In some embodiments, original image file 150 may be an image that is received on mobile computing device 100 from another source (e.g., via email and the like). Transmitting original image file 150 from mobile computing device 100 typically takes an extended amount of time. For example, transmitting original image file 150 via cellular communications link 130 may take up to thirty seconds or more. While particular file sizes and transmission times have been disclosed, the disclosure anticipates original image file 150 having any original file size and required transmission time.

Mid-sized image file 160 may be any image file that has a smaller/reduced resolution or file size than original image file 150 but a larger resolution or file size than small image file 170 discussed below. In certain embodiments, for example, mid-sized image file 160 may be an image file that has approximately half the resolution or file size of original image file 150. In another embodiment, mid-sized image file 160 may be an image file that has approximately one-third of the resolution or file size of original image file 150. In some embodiments, mid-sized image file 160 may be generated by mobile computing device 100 from original image file 150. While particular resolutions and file sizes of mid-sized image file 160 have been discussed, it should be understood that mid-sized image file 160 may have any resolution or file size that is less than those of original image file 150 but greater than those of small image file 170.

Small image file 170 may be any reduced image file that has a smaller/reduced resolution or file size than original image file 150. In certain embodiments, small image file 170 may be a thumbnail image. In some embodiments, small image file 170 may have a resolution of approximately 960 pixels or a file size of approximately 40-80 kilobytes (kB). Small image file 170 typically takes only a short amount of time to upload from mobile computing device 100. For example, small image file 170 may take approximately six seconds or less to upload via, for example, cellular communications link 130. In some embodiments, original image file 150 may be generated by mobile computing device 100 from original image file 150. While particular resolutions and file sizes of small image file 170 have been discussed, it should be understood that small image file 170 may have any resolution or file size that is less than those of original image file 150.

In some embodiments, original image files 150, mid-sized image files 160, or small image files 170 may include a unique identification (ID) or a timestamp. For example, unique IDs or timestamps may be generated or otherwise accessed when original image files 150, mid-sized image files 160, or small image files 170 are generated. The unique IDs or timestamps may be attached to original image files 150, mid-sized image files 160, or small image files 170 by, for example, embedding the unique IDs or timestamps in metadata of the generated image file. The unique ID or timestamp may be utilized by, for example, a social network to make the images available to users of the social network. In one example, timestamps of images are utilized to place the images on user's timelines.

Figure 2A:
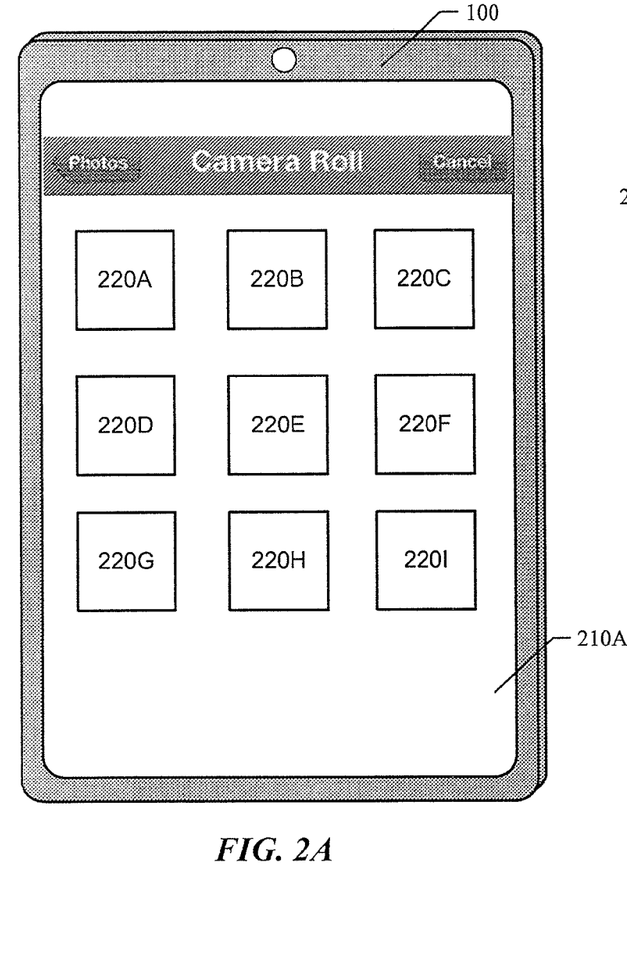
FIGS. 2A and 2B illustrate example graphical user interfaces that may be presented to a user on the mobile computing device of FIG. 1, according to certain embodiments of the present disclosure.
Figure 2B:
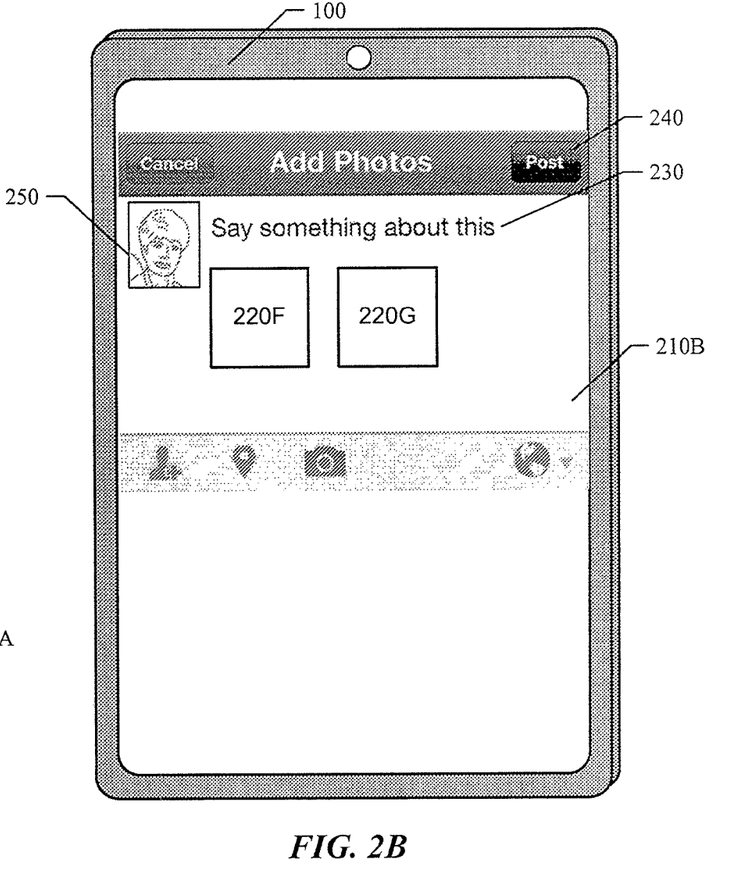

FIGS. 2A and 2B illustrate embodiments of GUIs 210A and 210B that may be presented to a user on the mobile computing device 100 of FIG. 1. In some embodiments, GUIs 210A and 210B may be associated with a social network such as social networking system 722 discussed below. In general, users of mobile computing device 100 may interact with GUIs 210A and 210B in order to select one or more images to upload from mobile computing device 100.

GUI 210A is one example of a GUI that a user of mobile computing device 100 may utilize to view and select one or more images 220 to upload. For example, GUI 210A may be displayed on mobile computing device 100 in response to a user's input to view or select images to upload. GUI 210A may graphically indicate or list one or more images 220 available to upload. Images 220 may be images that are stored in memory 120 of mobile computing device 100. For example, images 220 may be representations of original image files 150 stored in memory 120 of mobile computing device 100.

GUI 210B is one example of a GUI that may be presented to a user in response to a user selecting one or more images 220 to upload. In one embodiment, GUI 210B may be presented to a user in response to the user selecting images 220 such as images 220F and 220G from GUI 210A. In another embodiment, GUI 210B may be presented to a user in response to the user capturing images using a camera of mobile computing device 100.

GUI 210B includes an area where the one or more images 220 selected for uploading are displayed, a text input area 230, a post button 240, and a profile image 250. Text input area 230 is an area where a user may type text to be displayed along with images 220. For example, a user may type a description of an image 220 selected for uploading. The typed text may then be stored as metadata associated with the image 220 selected for uploading. Post button 240 is any button that allows a user to choose when to begin uploading selected images 220. In certain embodiments, post button 240 is a visual button displayed on GUI 210B that a user may touch or otherwise select in order to begin transmitting selected images 220 from mobile computing device 100. In other embodiments, post button 240 can be any physical or visual button on mobile computing device 100. Profile image 250 is an image that a user has selected as a graphical representation of himself. For example, profile image 250 is an avatar for the user on a social network.

In operation of example embodiments with reference to FIG. 1 in conjunction with FIGS. 2A and 2B, a user may interact with mobile computing device 100 in order to select one or more images to upload to, for example, a social network. In certain embodiments, a user may be presented, by application 180 with a GUI such as GUI 210A in which to select one or more images 220 to upload from mobile computing device 100. Application 180 may then determine one or more images 220 selected in GUI 210A by a user to upload. As illustrated in FIGS. 2A and 2B, for example, application 180 may determine images 220F and 220G were selected by the user to upload from mobile computing device 100.

Application 180 may, in response to determining that a user has selected one or more images 220 to upload from mobile computing device 100, access original image files 150 that are associated with the selected one or more images 220. For example, application 180 may access original image files 150F and 150G in response to determining that a user has selected images 220F and 220G to upload from mobile computing device 100. The accessed original image files 150 have an original resolution. That is, the original resolution in certain embodiments is substantially similar to a resolution of the image when it was first created or captured by a camera. In certain embodiments, the original resolution is a high resolution.

In certain embodiments, application 180 generates a reduced image file from the accessed original image file 150. In certain embodiments, the reduced image file is small image file 170. In some embodiments, the reduced image file is mid-sized image file 160. In either case, the generated reduced image file has a reduced resolution or file size that is lower than the original resolution or file size of original image file 150. As an example for illustrative purposes only, application 180 generates a small image file 170F from original image file 150F and a small image file 170G from original image file 150G. Application 180 may utilize any appropriate method for reducing or lowering the resolution of original image files 150 in order to create the reduced image.

In some embodiments, application 180 automatically uploads the one or more reduced image files from mobile computing device 100. In certain embodiments, application 180 immediately begins transmitting the one or more reduced image files before the user selects an option to upload one or more selected images. For example, application 180 may begin transmitting small image files 170F and 170G from mobile computing device 100 immediately after images 220F and 220G are selected by a user in GUI 210A. In certain embodiments, application 180 begins transmitting small image files 170F and 170G from mobile computing device 100 before a user selects post button 240 in GUI 210B. In some embodiments, the upload of small image file 170 makes small image file 170 available for access at least in part by one or more other users at an immediate point in time. As used herein, an "immediate point in time" may refer in some embodiments to a time that is of or near the present time with respect to the creation of content by a first user or selection of the content by the first user. For example, an "immediate point in time" may refer to a time that is of or near the present time with respect to a user of mobile computing device 100 capturing an image using a camera of computing device 100. In another example, an "immediate point in time" may refer to a time that is of or near the present time with respect to a user of mobile computing device 100 selecting an image on computing device 100 to upload.

In certain embodiments, application 180 transmits original image file 150 from mobile computing device 100 after the automatic transmission of the reduced image file. In some embodiments, application 180 transmits original image file 150 from mobile computing device 100 in response to a pre-determined upload condition. For example, application 180 may transmit original image files 150F and 150G at a later time from when it transmitted small image files 170F and 170G from mobile computing device 100. In some embodiments, original image file 150 is transmitted at a later time according to predetermined intervals. For example, original image file 150 is transmitted ten seconds, thirty seconds, a minute, or any other amount of time after the reduced file is transmitted.

In some embodiments, the reduced image file and original image file 150 are transmitted via different communications links. For example, the reduced image file may be immediately transmitted from mobile computing device 100 using cellular communications link 130. This may be, for example, in response to a determination by application 180 that mobile computing device 100 is not connected via WLAN 140. Then, after a pre-determined upload condition occurs, such as mobile computing device 100 establishing a connection via WLAN 140, application 180 may transmit original image file 150 from mobile computing device 100 via WLAN 140. As an example for illustrative purposes only, consider a scenario where a user utilizes mobile computing device 100 at a location that does not provide Wi-Fi access. While at this location, the user may wish to upload an image from mobile computing device 100 to a social network. Once the user selects the image using, for example, GUI 210A, mobile computing device 100 immediately begins uploading a reduced image file of the selected image to the social network using cellular communications link 130. As a result, the selected image may be viewable by other users of the social network at an immediate point in time without having to wait for a large image file to be uploaded across cellular communications link 130. Then, at a later time when mobile computing device 100 establishes a Wi-Fi connection at, for example, the user's home, mobile computing device 100 may then upload original image file 150 to the social network. The social network may, in some cases, replace the reduced image file with the original image file.

In some embodiments, application 180 may transmit mid-sized image files 160 in addition to small image file 170. For example, application 180 may transmit, after the automatic transmission of a small image file 170 from mobile computing device 100, a mid-sized image file 160 that was also generated from original image file 150. The transmission of mid-sized image file 160 may occur before, after, or in the place of original image file 150. As discussed above, the mid-sized image file has a mid-sized resolution that is lower than the resolution of original image file 150 but is higher than the resolution of small image file 170.

In certain embodiments, a social network receives the reduced image file that was originally transmitted by mobile computing device 100. In some embodiments, the social network may perform facial recognition on the reduced image. For example, the social network may analyze small image file 170 in order to determine one or more users of the social network that are shown in the small image file 170.

In some embodiments, the resolution of the generated reduced image file is substantially equal to a minimally-acceptable resolution. In some embodiments, the minimally-acceptable resolution may be hard-coded into application 180, may be determined by application 180 according to one or more business rules, may be a predetermined value stored in mobile computing device 100, or may be communicated from, for example, a server of a social network. After determining or otherwise accessing the minimally-acceptable resolution, application 180 may generate the reduced image file from original image file 150 according to the minimally-acceptable resolution. For example, if application 180 determines that the minimally-acceptable resolution is 150×150 pixels, it may generate a small image file 170 having a resolution substantially equal to 150×150 pixels from original image file 150.

In embodiments where application 180 determines the minimally-acceptable resolution according to one or more business rules, application 180 may first determine what type of image 220 the user has selected to upload. For example, application 180 may determine from a portion of a GUI that the user is attempting to upload an image 220 to be used as the user's profile image 250, a cover photo, a general photo, a newsfeed photo, or any other appropriate type of image. Application 180 may also access one or more business rules. The business rules may be stored on mobile computing device 100 or on a system within network 110 such as, for example, a server of a social network. The business rules may indicate instructions for each type of image 220. As one example, the business rules may indicate that profile images should have a resolution of 150×150 pixels. After determining the appropriate business rule, application 180 may generate the reduced image file according to the determined business rule.

Figure 3:
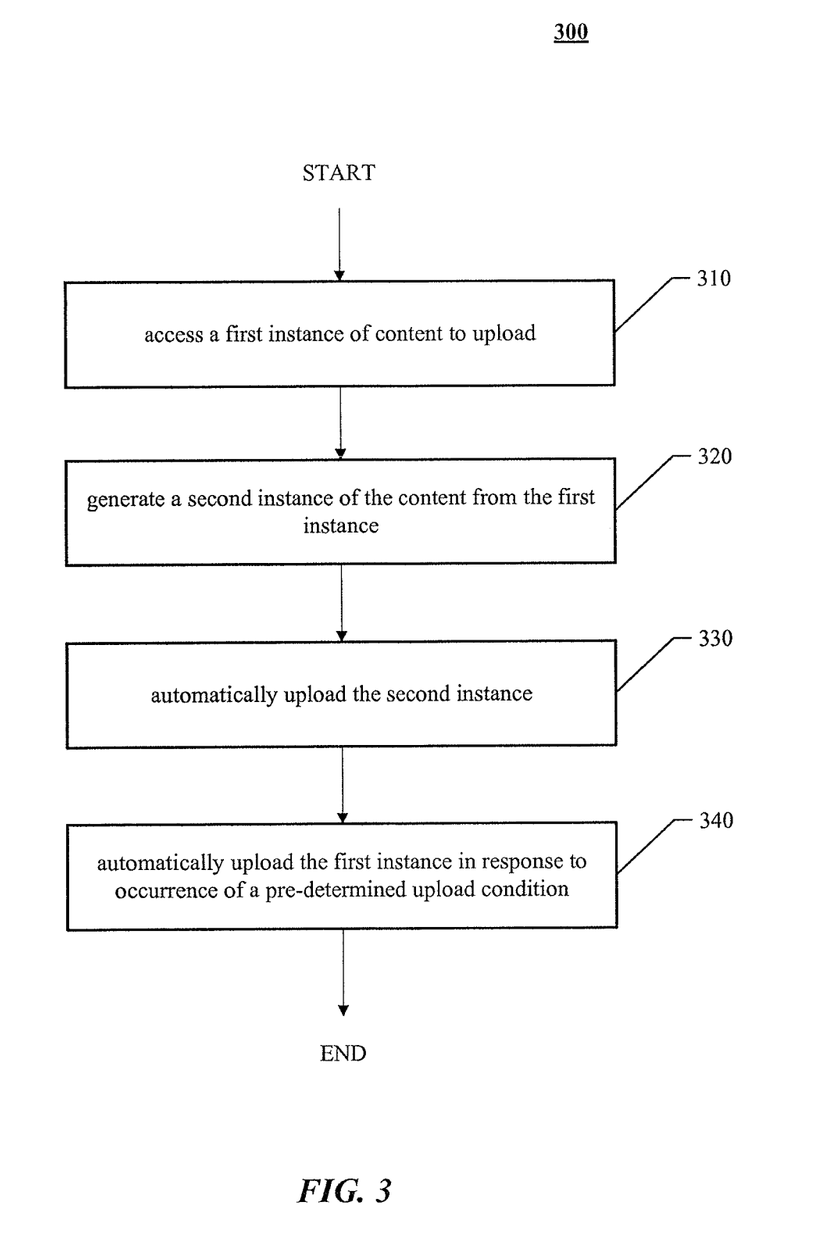
FIG. 3 illustrates an example method for providing progressive background uploading of images, in accordance with an embodiment of the disclosure.

FIG. 3 illustrates an example method 300 for providing progressive background uploading of content. Method 300 may be utilized, for example, by application 180 on mobile computing device 100 to upload one or more images of various file sizes or resolutions from mobile computing device 100. Method 300 begins in step 310 where a first instance of content to be uploaded to a server is accessed. In some embodiments, an original image file is accessed according to one or more images selected by a user to upload. For example, application 180 may determine one or more image 220 are selected by a user in a GUI 210A to upload from mobile computing device 100. In response, application 180 may access original image file 150 as discussed above. The first instance has a first file size. In certain embodiments, the content may be an image, a video, music, or any other appropriate content.

In step 320, a second instance of the content of step 310 is generated. For example, a reduced image file is generated from the original image file accessed in step 310. In some embodiments, the reduced image file is small image file 170 discussed above. In some embodiments, the reduced image file is mid-sized image file 160 discussed above. In either case, the second instance has a second file size that is smaller than the first file size. For example, the reduced image file generated in step 330 has a reduced resolution or file size which is lower than the original resolution or file size of the original image file of step 320.

In step 330, the second instance of step 320 is automatically uploaded to the server, making the content available for access at least in part by one or more users at an immediate point in time. For example, the reduced image file generated in step 320 is automatically uploaded from the mobile computing device. In some embodiments, this includes transmitting the reduced image file before the user selects an option to upload the one or more selected images from mobile computing device 100. For example, the reduced image file may be automatically transmitted in step 330 after a user selects one or more images 220 using GUI 210A but before a user selects post button 240 in GUI 210B. In some embodiments, the second instance of the content is uploaded to a social network. The upload of the second instance makes the content available for access at least in part by one or more second users at an immediate point in time.

In step 340, which is an optional step, the first instance of the content is automatically uploaded to the server. For example, the original image file of step 310 is uploaded from the mobile computing device after the automatic uploading of the reduced image file in step 330. In certain embodiments, step 340 occurs in response to a pre-determined upload condition. For example, the pre-determined upload condition may include upload conditions improving for the mobile computing device. Example of upload conditions improving may include establishing a WLAN connection (e.g., establishing a Wi-Fi connection), bandwidth becoming available over an existing cellular or WLAN communications link, a signal strength of an existing cellular or WLAN communications link improving, or any other condition in which the mobile computing device is able to upload content at a faster rate. In some embodiments, the first instance of the content is uploaded to a social network. In certain embodiments, the first instance of the content (e.g., the original image file) replaces the second instance (e.g., the reduced image file). After step 340, method 300 ends.

In some embodiments, users may select multiple images 220 to upload from mobile computing device 100. To accommodate this, some embodiments of mobile computing device 100 may establish one or more queues for uploading the various sizes of images. FIGS. 4A and 4B below illustrate various embodiments of upload queues that may be utilized in some embodiments.

FIGS. 4A and 4B illustrate upload queues 410, 420, and 430 that may be utilized by mobile computing device 100 to progressively upload multiple small image files 170, mid-sized image files 160, or original image files 150. In FIG. 4A, a first queue 410 includes multiple small image files 170 and a second queue 420 includes multiple original image files 150. In FIG. 4B, first queue 410 includes multiple small image files 170, second queue 420 includes multiple mid-sized image files 160, and third queue 430 includes multiple original image files 150. While FIG. 4B illustrates second queue 420 including multiple mid-sized image files 160 and third queue 430 including multiple original image files 150, other embodiments may be reversed in which second queue 420 includes multiple original image files 150 and third queue 430 includes multiple mid-sized image files 160.

As discussed above, a user may utilize a GUI such as GUI 210A to select multiple images 220 for upload. Upon detecting that a user has selected multiple images for uploading, application 180 may immediately in the background begin uploading reduced image files according to first queue 410. For example, if the user selects four images 220A-220D for uploading, application 180 may generate small image files 170A-170D and then generate first queue 410 that indicates the order in which to upload small image files 170A-170D. Application 180 may then immediately begin uploading the generated files according to first queue 410 before the user further interacts with mobile computing device 100. For example, application 180 may first upload small image file 170A. After small image file 170A is uploaded, small image file 170B may be uploaded, and so on. After the last file in first queue 410 is uploaded (e.g., small image file 170D is uploaded), some embodiments may immediately or after a predetermined interval begin uploading original image files 150 according to second queue 420. In some embodiments, second queue 420 may begin after a pre-determined upload condition occurs, as discussed above. As illustrated, original image file 150A may be uploaded first. After original image file 150A is uploaded, original image file 150B is uploaded, and so on until the last file in second queue 420 is uploaded (e.g., original image file 150D is uploaded). As described above, second queue 420 may begin immediately after first queue 410 is completed, when mobile computing device 100 establishes a connection to WLAN 140, or any appropriate interval (e.g., 30 seconds later, a minute later, etc.).

In some embodiments, as illustrated in FIG. 4B, mid-sized image files 160 may additionally be uploaded via an upload queue. In the illustrated embodiment, second queue 420 includes multiple mid-sized image files 160 that are uploaded sequentially before original image files 150 are uploaded via third queue 430. It should be noted, however, that some embodiments may upload mid-sized image files 160 in third queue 430 after original image files 150 are uploaded in second queue 420.

Figure 5:
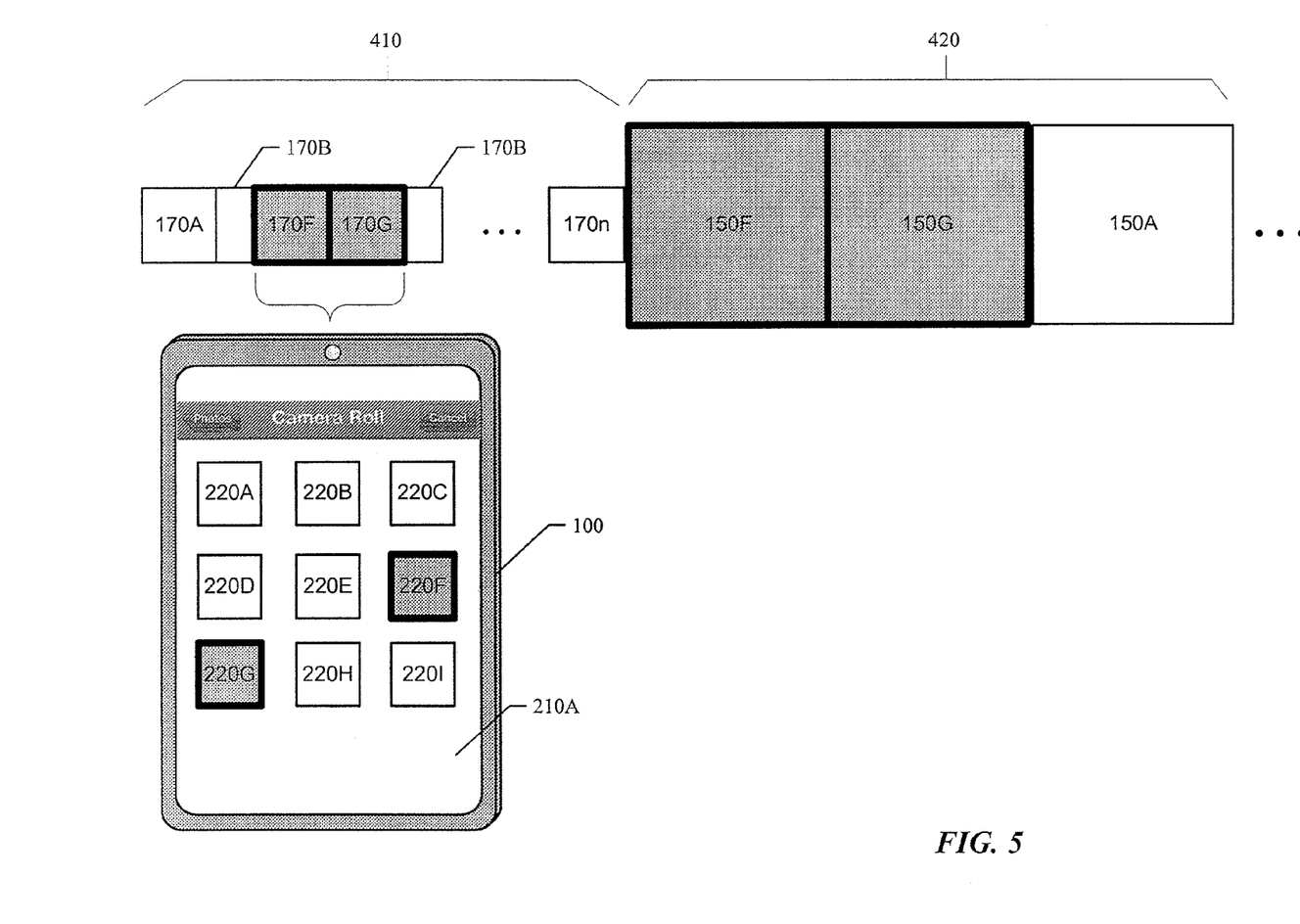
FIG. 5 illustrates an example of interrupting the download queues of FIGS. 4A-4B, in accordance with an embodiment of the disclosure.

FIG. 5 illustrates an example embodiment in which the download queues of FIGS. 4A and 4B are interrupted in order to upload reduced image files according to a current selection by a user. In this embodiment, mobile computing device 100 is in the process of uploading small image files 170 according to first queue 410 when a user selects one or more images 220 to upload. For example, a user utilizes GUI 210A to select image 220F and 220G to upload from mobile computing device 100. When application 180 detects that the user has selected the images 220 to upload, it may generate reduced image files for the selected images (e.g., small image files 170F and 170G) and suspend the transmission of first queue 410. In this case, for example, mobile computing device 100 suspends uploading small image file 170B. Application 180 then transmits the reduced selected images (e.g., small image files 170F and 170G) from mobile computing device 100 after the suspension of first queue 410. After completing uploading small image files 170F and 170G, application 180 may continue uploading first queue 410. In this example, application 180 continues where it left off by uploading the remainder of small image file 170B.

In some embodiments, application 180 may alter any subsequent upload queues in which original image files 150 are uploaded according to a current user selection. For example, as illustrated in FIG. 5, original image files 150F and 150G are placed at the first of second queue 420. As soon as first queue 410 is completed, application 180 may begin second queue 420 by uploading original image file 150F.

Figure 6:
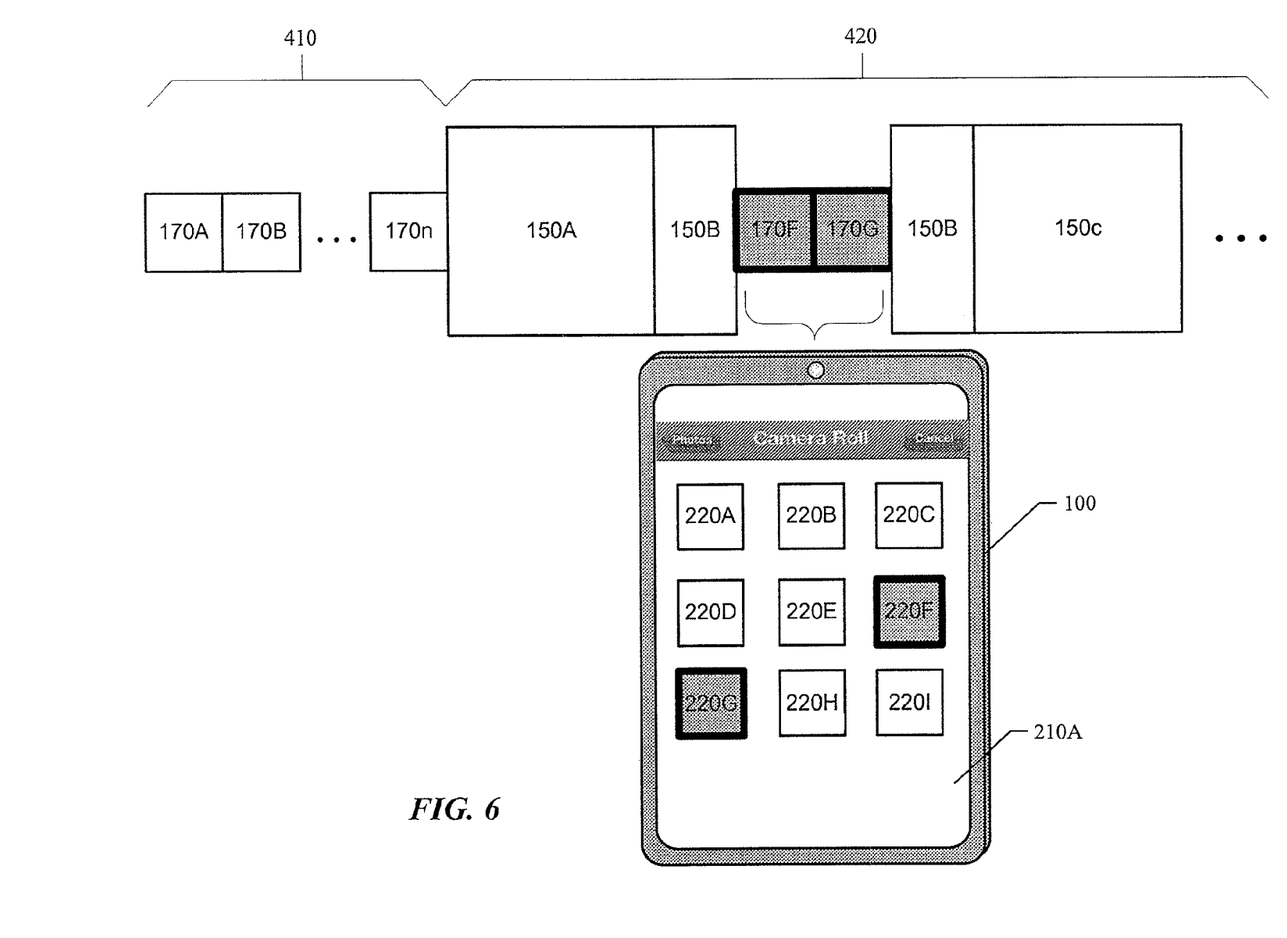
FIG. 6 illustrates another example of interrupting the download queues of FIGS. 4A-4B, in accordance with an embodiment of the disclosure.

FIG. 6 illustrates another example embodiment in which the download queues of FIGS. 4A and 4B are interrupted in order to upload reduced image files according to a current selection by a user. In this embodiment, mobile computing device 100 is in the process of uploading original image files 150 according to second queue 420 when a user selects one or more images 220 to upload. For example, a user utilizes GUI 210A to select image 220F and 220G to upload from mobile computing device 100. When application 180 detects that the user has selected the images 220 to upload, it may generate reduced image files for the selected images (e.g., small image files 170F and 170G) and suspend the transmission of second queue 420. In this case, for example, mobile computing device 100 suspends uploading original image file 150B. Application 180 then transmits the reduced selected images (e.g., small image files 170F and 170G) from mobile computing device 100 after the suspension of second queue 420. After completing uploading small image files 170F and 170G, application 180 may continue uploading according to second queue 420. In this example, application 180 continues where it left off by uploading the remainder of original image file 150B.

In some embodiments, the download queues of FIGS. 4A and 4B may be interrupted by a command transmitted to mobile computing device 100 instead of by a user selecting one or more images 220 to upload. For example, a server of a social network may send a command to application 180 on mobile computing device 100 to send a reduced image file for a particular image located on mobile computing device 100. This may interrupt whichever download queue is currently in progress on mobile computing device 100 as discussed above. In some embodiments, the download queues may reside entirely external to mobile computing device 100. For example, the download queues may reside on a server of a social network. In these embodiments, commands are transmitted to mobile computing device 100 in order to begin uploading images that are stored on mobile computing device 100.

While particular embodiments have been illustrated using image files, other embodiments may progressively upload any other appropriate content. For example, some embodiments may progressively upload video files of different resolutions or files sizes. Other embodiments may progressively upload music files of different audio quality or file sizes. The disclosure anticipates progressively uploading any appropriate content and is not limited to image files.

Figure 7:
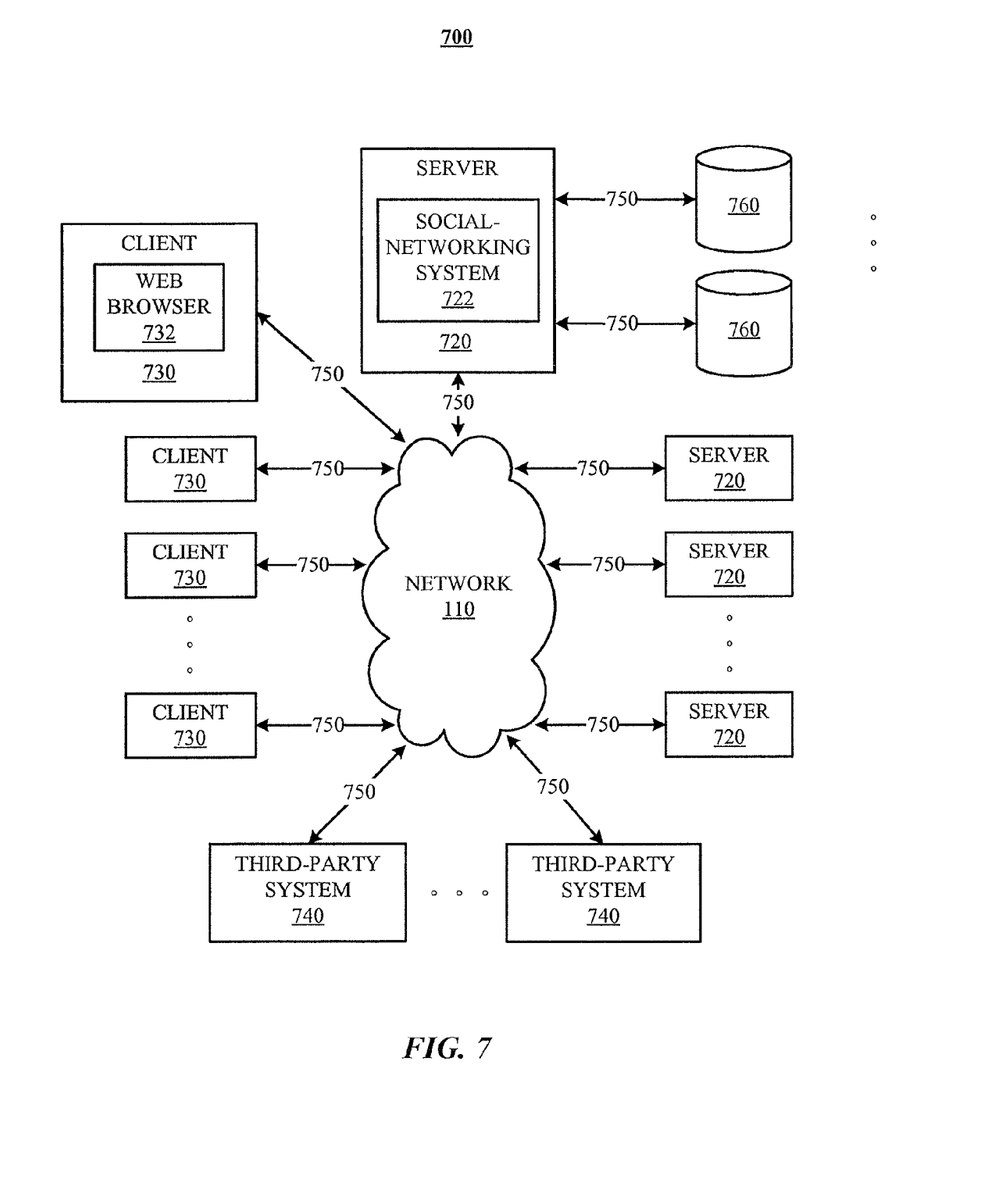
FIG. 7 illustrates an example network architecture associated with a social network, in accordance with an embodiment of the disclosure.

FIG. 7 illustrates an example network environment 700. Network environment 700 includes network 110 coupling one or more servers 720 and one or more clients 730 to each other. In particular embodiments, network 110 also enables servers 720 to transmit data to or from third-party systems 740. In particular embodiments, network 110 is an intranet, an extranet, a virtual private network (VPN), a local area network (LAN), a wireless LAN (WLAN), a wide area network (WAN), a metropolitan area network (MAN), a portion of the Internet, a cellular technology-based network, a satellite communications technology-based network, or another network 110 or a combination of two or more such networks 110. This disclosure contemplates any suitable network 110.

One or more links 750 couple a server 720 or a client 730 to network 110. In particular embodiments, one or more links 750 each includes one or more wireline, wireless, or optical links 750. In particular embodiments, one or more links 750 each includes an intranet, an extranet, a VPN, a LAN, a WLAN, a WAN, a MAN, a portion of the Internet, a cellular technology-based network, a satellite communications technology-based network, or another link 750 or a combination of two or more such links 750. This disclosure contemplates any suitable links 750 coupling servers 720 and clients 730 to network 110.

In particular embodiments, each server 720 may be a unitary server or a distributed server spanning multiple computers or multiple datacenters. Servers 720 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 720 may include hardware, software, or embedded logic components or a combination of two or more such components for carrying out the appropriate functionalities implemented or supported by server 720. For example, a web server is generally capable of hosting websites containing web pages or particular elements of web pages. More specifically, a web server may host HTML files or other file types, or may dynamically create or constitute files upon a request, and communicate them to clients 730 in response to HTTP or other requests from clients 730. A mail server is generally capable of providing electronic mail services to various clients 730. A database server is generally capable of providing an interface for managing data stored in one or more data stores. In particular embodiments, a social-networking system 722 may be hosted on a server 720.

The social networking system 722 comprises one or more computing devices storing a social network, or a social graph, comprising a plurality of users and providing users of the social network with the ability to communicate and interact with other users of the social network. According to various embodiments, the social networking system 722 may comprise a website, or alternatively a server that can be accessed through network 110 by client devices 730 or third-party content object providers 740. In use, users join the social networking system 722 and then add connections (i.e., relationships) to a number of other users of the social networking system 722 to whom they desire to be connected. As used herein, the term "friend" refers to any other user of the social networking system 722 to whom a user has formed a connection, association, or relationship via the social networking system 722. Connections may be added explicitly by a user or may be automatically created by the social networking systems 722 based on common characteristics of the users (e.g., users who are alumni of the same educational institution). For example, a first user specifically selects a particular other user to be a friend. Connections in the social networking system 722 are usually in both directions, but need not be, so the terms "user" and "friend" depend on the frame of reference. Connections between users of the social networking system 722 are usually bilateral, or "mutual," but connections may also be unilateral, or "one-way." For example, if Bob and Joe are both users of the social networking system 722 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

In addition to establishing and maintaining connections between users and allowing interactions between users, the social networking system 722 provides users with the ability to take actions on various types of items, or objects, supported by the social networking system 722. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 722, transactions that allow users to buy or sell items via the service, and interactions with advertisements that a user may perform on or off the social networking system.

These are just a few examples of the items upon which a user may act on a social networking system, and many others are possible. A user may interact with anything that is capable of being represented in the social networking system 722 or by an external system of the third-party content object provider 740, which is separate from the social networking system 722 and coupled to the social networking system 722 via network 110.

The social networking system 722 is also capable of linking a variety of entities. For example, the social networking system 722 enables users to interact with each other as well as receive content from third-party content object providers 740 or other entities, or to allow users to interact with these entities through an API or other communication channels.

In particular embodiments, one or more data storages 760 may be communicatively linked to one or more severs 720 via one or more links 750. In particular embodiments, data storages 760 may be used to store various types of information. In particular embodiments, the information stored in data storages 760 may be organized according to specific data structures. In particular embodiments, each data storage 760 may be a relational database. Particular embodiments may provide interfaces that enable servers 720 or clients 730 to manage, e.g., retrieve, modify, add, or delete, the information stored in data storage 760.

In particular embodiments, each client 730 may be an electronic device including hardware, software, or embedded logic components or a combination of two or more such components and capable of carrying out the appropriate functionalities implemented or supported by client 730. For example and without limitation, a client 730 may comprise a computer system such as: a desktop computer, a notebook or laptop, a netbook, a tablet, an e-book reader, a GPS device, a camera, a personal digital assistant (PDA), a handheld electronic device, a mobile telephone, or another similar processor-based electronic device. This disclosure contemplates any suitable clients 730. A client 730 may enable a network user at client 730 to access network 730. A client 730 may enable its user to communicate with other users at other clients 730. In particular embodiments, a client device 730 may comprise a mobile computing device 300 as described in FIGS. 3A and 3B.

A client 730 may have a web browser 732, such as MICROSOFT® INTERNET EXPLORER®, GOOGLE CHROME™ or MOZILLA FIREFOX®, and may have one or more add-ons, plug-ins, or other extensions, such as TOOLBAR or YAHOO TOOLBAR®. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT®, JAVA®, MICROSOFT® SILVERLIGHT®, combinations of markup language and scripts such as AJAX (Asynchronous JAVASCRIPT® and XML), and the like. Herein, reference to a web page encompasses one or more corresponding web page files (which a browser may use to render the web page) and vice versa, where appropriate.

In particular embodiments, each third-party system 740 may comprise (1) one or more types of servers, (2) one or more data stores, (3) one or more interfaces, including but not limited to application programming interfaces (API), (4) one or more web services, (5) one or more content sources, (6) one or more networks, or any other conventional element that might be included in a third-party system to or from which server 720 might transmit data. A third-party system 740 may be operated by a different entity from the entity operating social-networking system 722. In particular embodiments, however, the social networking system 722 and the third-party systems 740 may operate in conjunction to provide social networking services to users of the social networking system 722. In this sense, the social networking system 722 may provide a platform, or backbone, which other systems, such as third-party systems 740, may use to provide social networking services and functionality to users across the Internet.

In particular embodiments, a third-party system 740 may comprise a third-party content object provider. A third-party content object provider 740 comprises one or more sources of content objects, which are communicated to the client device 730 at appropriate times. In one embodiment, the third-party content object provider 740 is a separate entity from the social networking system 722. For example, the third-party content object provider 740 is associated with a first domain while the social networking system 722 is associated with a separate social networking domain. In various embodiments, the third-party content object provider 740 is located on a website or alternatively a server, separate or in conjunction from the website or server that hosts the social networking system 722.

The third-party content objects, as the term is used herein, include any content object generated by a third-party content object provider 740 rather than by a user of the social networking system 722. Content objects generally may include information regarding things or activities of interest to the user. Third-party content objects include informational content objects, such as movie show times, movie reviews, restaurant reviews, restaurant menus, product information and reviews, etc., as well as incentive content objects, such as coupons, discount tickets, gift certificates, etc. according to one embodiment. In addition, some third-party content objects may include a combination of information and incentives. Other examples of content objects include event content objects associated with an event (e.g., a New Year's Eve party) or ad-hoc gathering objects (e.g., an impromptu gathering of 700 people in Union Square, San Francisco). Examples of content objects and the ways in which content objects may be presented or used are described below.

The social networking system 722 also includes user-generated content objects, which enhances a user's interactions with the social networking system 722. User-generated content may include anything a user can add, upload, send, or "post," to the social networking system 722. For example, a user communicates posts to the social networking system 722 from a client device 730. Posts may include data such as status updates or other textual data, location information, photos, videos, links, music or other similar data or media. Content may also be added to the social networking system 722 by a third-party through a "communication channel," such as a newsfeed or stream.

Content objects, generally, represent single pieces of content that are represented as objects in the social networking system 722. In this way, users of the social networking system 722 are encouraged to communicate with each other by posting text and content objects of various types through various communication channels, increasing the interaction of users with each other and increasing the frequency with which users interact with the social networking system 722.

Figure 8:
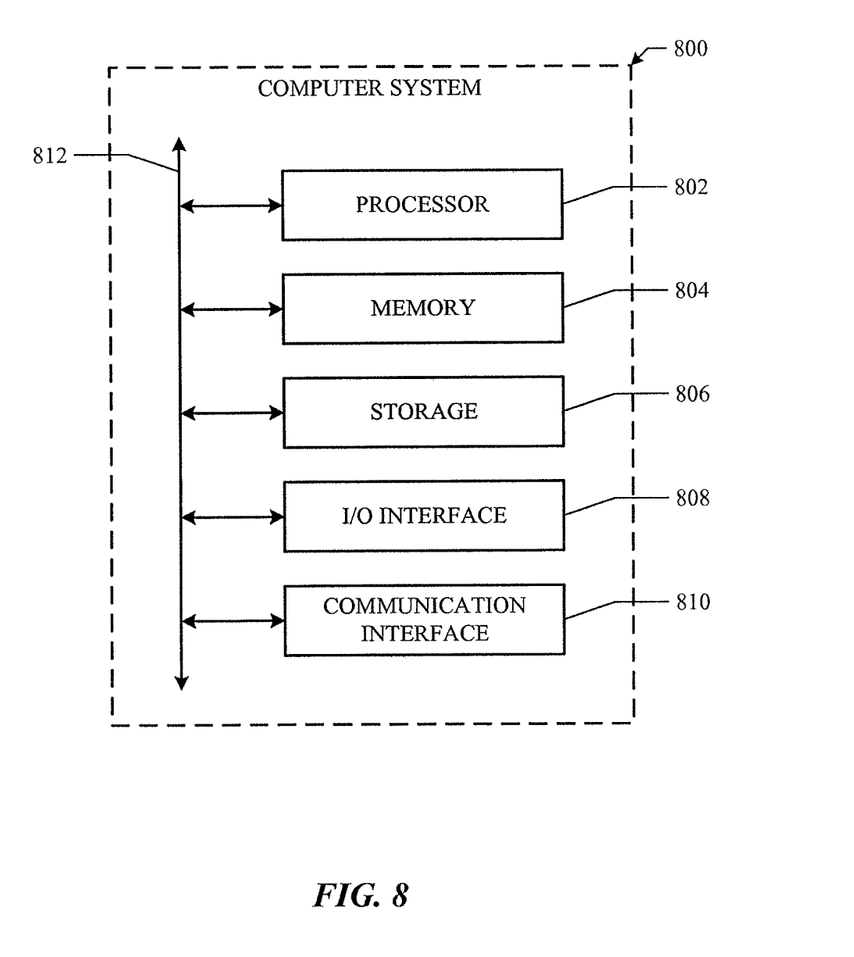
FIG. 8 illustrates an example computer system for performing particular embodiments, in accordance with an embodiment of the disclosure.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple datacenters; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. Although this disclosure describes and illustrates particular memory, this disclosure contemplates any suitable memory.

In particular embodiments, storage 806 includes mass storage for data or instructions. Storage 806 may include removable or non-removable (i.e., fixed) media, where appropriate. Storage 806 may be internal or external to computer system 800, where appropriate. In particular embodiments, storage 806 is non-volatile, solid-state memory. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 810 for it. Although this disclosure describes and illustrates a particular communication interface, this disclosure contemplates any suitable communication interface.

In particular embodiments, bus 812 includes hardware, software, or both coupling components of computer system 800 to each other. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a mobile computing device, accessing a first instance of an image to be sent to a second computing system over one or more computer networks, the first instance of the image having a first file size;
   by the mobile computing device, generating a second instance of the image from the first instance, wherein the second instance has a second file size that is smaller than the first file size; and
   by the mobile computing device, after the image has been selected using a first graphical user interface (GUI) but before an option in a second GUI has been selected to send the image to the second computing system, automatically attempting to send the second instance of the image to the second computing system over the one or more computer networks.

2. The method of claim 1, wherein the first and second instances of the image are stored in one or more memory units of the mobile computing device.

3. The method of claim 1, wherein the first GUI comprises a camera roll of the mobile computing device, the camera roll displaying images captured by a camera of the mobile computing device.

4. The method of claim 1, wherein the second GUI comprises:
   an area where a representation of the image selected in the first GUI is displayed;
   a text input area; and
   the option to send the image and any text from the second computing system.

5. The method of claim 1, wherein the generated second instance of the image comprises a unique identification (ID) or a timestamp.

6. The method of claim 1, further comprising:
   in response to occurrence of a pre-determined upload condition determined by the mobile computing device after the attempt to upload the second instance of the image, automatically attempting to send the first instance of the image to the second computing system over the one or more computer networks, wherein:
   attempting to send the second instance of the image to the second computing system comprises attempting to send the second instance of the image to the second computing system via a cellular communications link before a user selects the option in the second GUI to send the image to the second computing system;
   the pre-determined upload condition comprises a wireless local area network communications link being established by the mobile computing device; and
   the attempt to send the first instance of the image occurs:
   after the attempt to send the second instance of the image; and
   after the mobile computing device has established the wireless local area network communications link.

7. The method of claim 1, wherein the second instance of the image is generated and the attempt to send the second instance of the image is made in response to a determination that the mobile computing device is not connected to a wireless local area network.

8. The method of claim 1, further comprising attempting to send, after attempting to send the second instance of the image, a third instance of the image generated from the first instance, wherein the third instance of the image has a third file size that is smaller than the first file size but larger than the second file size.

9. The method of claim 1, wherein:
   the second computing system comprises a server associated with a social network; and
   facial detection or recognition is performed on the second instance of the image by the social network.

10. The method of claim 1, the method further comprising:
    determining a minimally acceptable resolution for images to be sent to the second computing system; and the second instance of the image is generated according to the determined minimally acceptable resolution.

11. One or more computer-readable non-transitory storage media embodying logic that is operable when executed to:
receive, at a server from a mobile computing device over one or more first computer networks, a first computer file having a first file size, the first computer file comprising media content, at least a portion of the first computer file received after the media content was selected using a first graphical user interface (GUI) displayed on the mobile computing device but before an option in a second GUI displayed on the mobile computing device was selected to send the media content to the server; and
receive, at the server from the mobile computing device over one or more second computer networks, a second computer file associated with the media content and having a second file size that is larger than the first file size, the second computer file received after occurrence of a pre-determined condition.

12. The one or more computer-readable non-transitory storage media of claim 11, wherein the media content of the first and second computer files comprises an image, music, or a video.

13. The one or more computer-readable non-transitory storage media of claim 11, wherein:
the one or more first computer networks comprises a cellular communications network; and
the one or more second computer networks comprises a Wi-Fi network.

14. The one or more computer-readable non-transitory storage media of claim 11, wherein the one or more first computer networks and the one or more second computer networks comprises the same computer networks.

15. The one or more computer-readable non-transitory storage media of claim 11, the logic further operable when executed to:
display the media content of the first image file on a timeline of a user associated with the mobile computing device.

16. The one or more computer-readable non-transitory storage media of claim 11, wherein the pre-determined condition comprises:
a wireless local area network communications link being established by the mobile computing device;
bandwidth becoming available over an existing communications link;
a signal strength of an existing communications link improving; or
the mobile computing device determining that it is able to upload content at a faster rate.

17. A system comprising:
one or more memory units; and
one or more processing units communicably coupled to the one or more memory units and operable to:
receive, from a mobile computing device over one or more computer networks, a first computer file having a first file size, the first computer file comprising media content, at least a portion of the first computer file received after the media content was selected using a first graphical user interface (GUI) displayed on the mobile computing device but before an option in a second GUI displayed on the mobile computing device was selected to post the media content to a server;
receive, from the mobile computing device over the one or more computer networks, a second computer file associated with the media content and having a second file size that is larger than the first file size, the second computer file received after occurrence of a pre-determined condition; and
store the first and second computer files in the one or more memory units.

18. The system of claim 17, wherein the one or more computer networks comprises:
a cellular communications network; and
a Wi-Fi network.

19. The system of claim 17, the one or more processing units further operable to:
display the media content of the first image file on a timeline of a user associated with the mobile computing device.

20. The system of claim 17, wherein the pre-determined condition comprises:
a wireless local area network communications link being established by the mobile computing device;
bandwidth becoming available over an existing communications link;
a signal strength of an existing communications link improving; or
the mobile computing device determining that it is able to upload content at a faster rate.

* * * * *